United States Patent
Kim et al.

(10) Patent No.: US 8,159,523 B2
(45) Date of Patent: Apr. 17, 2012

(54) METHOD FOR CAPTURING CONVERGENT-TYPE MULTI-VIEW IMAGE

(75) Inventors: Wook-Joong Kim, Daejeon (KR); Sang-Woo Ahn, Daejeon (KR); In-Jae Lee, Daejeon (KR); Myung-Seok Ki, Daejeon (KR); Kyu-Heon Kim, Daejeon (KR); Jin-Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1347 days.

(21) Appl. No.: 11/718,032

(22) PCT Filed: Jul. 26, 2005

(86) PCT No.: PCT/KR2005/002409
§ 371 (c)(1),
(2), (4) Date: Apr. 26, 2007

(87) PCT Pub. No.: WO2006/052057
PCT Pub. Date: May 18, 2006

(65) Prior Publication Data
US 2009/0135244 A1 May 28, 2009

(30) Foreign Application Priority Data
Nov. 11, 2004 (KR) .................. 10-2004-0091935

(51) Int. Cl.
*H04N 7/00* (2006.01)
(52) U.S. Cl. ................ 348/36; 348/47; 348/E7.001
(58) Field of Classification Search .............. 348/36, 348/47, E7.001; 382/154
See application file for complete search history.

(56) References Cited

U.S. PATENT DOCUMENTS

| | | | |
|---|---|---|---|
| 5,424,773 A | 6/1995 | Saito | |
| 5,657,073 A | 8/1997 | Henley | |
| 6,118,475 A | 9/2000 | Iijima et al. | |
| 6,151,028 A * | 11/2000 | Kumagai et al. | 345/427 |
| 6,163,337 A * | 12/2000 | Azuma et al. | 348/43 |
| 6,191,808 B1 * | 2/2001 | Katayama et al. | 348/39 |
| 6,268,862 B1 * | 7/2001 | Uchiyama et al. | 345/427 |
| 6,384,859 B1 * | 5/2002 | Matsumoto et al. | 348/43 |
| 6,400,373 B1 * | 6/2002 | Uchiyama et al. | 345/629 |
| 6,466,892 B2 * | 10/2002 | Fujii et al. | 702/150 |
| 6,608,622 B1 * | 8/2003 | Katayama et al. | 345/419 |
| 6,747,610 B1 * | 6/2004 | Taima et al. | 345/6 |
| 6,757,441 B1 * | 6/2004 | Katayama et al. | 382/248 |

(Continued)

FOREIGN PATENT DOCUMENTS

EP  0 830 034  3/1998

(Continued)

*Primary Examiner* — Alina N. Boutah
(74) *Attorney, Agent, or Firm* — Ladas & Parry LLP

(57) ABSTRACT

Provided is a method for convergent type three-dimensional (3D) multi-viewpoint image acquisition. The method for acquiring a multi-viewpoint image in an image acquisition apparatus comprises the steps of: converting the image acquisition apparatus to a multi-viewpoint image photographing mode; if converted to the multi-viewpoint image photographing mode in the converting step, providing a plurality of geometric shapes to set a position of an object to be photographed within a screen and selecting a desired shape of the geometric shapes in response to an inputted shape selection signal; if the desired geometric shape is selected in the shape providing step, adjusting a position and a size of the selected geometric shape in response to a shape adjustment signal; and photographing a whole image having the object that places within the adjusted geometric shape in the adjusting step.

5 Claims, 6 Drawing Sheets

U.S. PATENT DOCUMENTS

| | | | |
|---|---|---|---|
| 6,895,180 B2* | 5/2005 | Artonne et al. | 396/71 |
| 6,915,298 B1* | 7/2005 | Cain et al. | 1/1 |
| 7,034,861 B2* | 4/2006 | Okada et al. | 348/36 |
| 7,035,453 B2* | 4/2006 | Liu | 382/154 |
| 2001/0043738 A1* | 11/2001 | Sawhney et al. | 382/154 |
| 2001/0045979 A1* | 11/2001 | Matsumoto et al. | 348/43 |
| 2002/0106135 A1* | 8/2002 | Iwane | 382/305 |
| 2002/0136150 A1* | 9/2002 | Mihara et al. | 369/125 |
| 2003/0026474 A1* | 2/2003 | Yano | 382/154 |
| 2003/0108244 A1* | 6/2003 | Li et al. | 382/227 |
| 2003/0169627 A1* | 9/2003 | Liu | 365/200 |
| 2003/0206653 A1* | 11/2003 | Katayama et al. | 382/154 |
| 2004/0090391 A1* | 5/2004 | Kondo | 345/1.1 |
| 2004/0258309 A1* | 12/2004 | Keaton et al. | 382/190 |
| 2005/0244050 A1* | 11/2005 | Nomura et al. | 382/154 |
| 2006/0050383 A1* | 3/2006 | Takemoto et al. | 359/462 |
| 2006/0209183 A1* | 9/2006 | Mashitani et al. | 348/51 |

FOREIGN PATENT DOCUMENTS

| | | |
|---|---|---|
| JP | 04-097662 A | 3/1992 |
| JP | 2002-34055 | 1/2002 |
| KR | 10-0155842 B1 | 7/1998 |
| KR | 10-0245028 | 11/1999 |
| KR | 10-2000-0001214 | 1/2000 |
| KR | 10-0286306 | 1/2001 |
| KR | 10-2004-0049832 | 6/2004 |
| WO | WO 99-51027 | 10/1999 |

* cited by examiner

FIG. 2
(PRIOR ART)
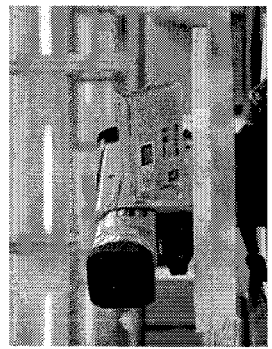
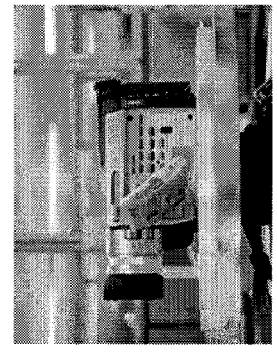

METHOD FOR CAPTURING CONVERGENT-TYPE MULTI-VIEW IMAGE

TECHNICAL FIELD

The present invention relates to a method for convergent type three-dimensional (3D) multi-viewpoint image acquisition, and more particularly, to a method for acquiring a stable convergent type 3D multi-viewpoint image in case of photographing a convergent type 3D multi-viewpoint image, without using a special device or performing complex postprocessing.

BACKGROUND ART

Due to recent development of digital image acquisition and processing technologies, a variety of image photographing has been made through the use of a digital camera and a camcorder. In other words, still image or moving image for a short time is photographed using a digital camera, while various moving images are photographed using a camcorder.

Also, development has been made from simple two-dimensional (2D) image photographing to 3D image photographing owing to evolution of image photographing technique. Namely, the photographing technique has been developed from 2D image photographing that acquires image information on a plane using a single fixed camera to 3D image photographing that acquires multi-viewpoint images while moving camera.

A typical example of 3D multi-viewpoint image acquisition techniques is panoramic image photographing technique. A part of existing digital cameras offers a panoramic image photographing function. This panoramic image photographing function allows a user to photograph a plurality of images by moving little by little a camera horizontally or a photographing angle, and then to obtain one large image by stitching the photographed images.

3D image acquisition methods are largely classified into three types: parallel type, convergent type and divergent type. FIG. 1 shows each of the above three types.

Among the image acquisition methods shown in FIG. 1, a panoramic image acquisition method is limited to a case of photographing in the parallel type or divergent type. A principal goal to make the panoramic image is to compose images for ambient environment and scenery at various viewpoints.

The convergent type photographing technique in the 3D multi-viewpoint image acquisition is a technique which concentrates photographing viewpoints to a center, which is opposite of the divergent type and photographs an object while moving camera in circular manner. By this means, various viewpoints of an object (e.g. commercial goods for the internet shopping) can be provided to users by photographed images, and users can control their viewpoints as they want. FIG. 2 shows an example that photographs an object in the convergent type.

Meanwhile, to acquire a high quality 3D multi-viewpoint image, trembling of hands and movement of camera should be minimized on photographing. In the process of generating a panoramic image in the parallel and divergent type photographing ways, compensation for tremble of camera is conducted in a stitching algorithm after photographing. Even with this compensation process, however, stable photographing should be premised to obtain the high quality of panoramic image.

Further, in case of acquiring 3D multi-viewpoint images in the convergent type, it is not easy to process with respect to tremble and movement which occur in photographing. Since the convergent type multi-viewpoint image is configured in such a way in order for providing different views of an object to a user, there may be a significant inconvenience when the user uses the 3D multi-viewpoint images whose different viewpoint images are not aligned.

For example, in case where the user photographs a specific object while rotating at a predetermined angle only in a horizontal direction where a vertical direction is fixed, the most efficient case may be the case of acquiring image while moving a camera at a predetermined angle in a state where a focus and an zooming of the camera are unchanged. In the case of photographing convergent type multi-viewpoint images, however, acquired images would be photographed in the unstable state due to a tremble of hands and a vertical movement of camera when photographing an object while person moves without using a special device.

To solve the above problem, that is, the tremble phenomenon, images are photographed using a special device, or endeavors have been progressed to minimize the tremble problem of photographed images using a postprocessing technique.

However, equipment with a method for using the special device is costly, and is also employed only in some special companies since there is a spatial limitation for its installation for general users to use. Moreover, a method using a digital image processing techniques by computer has a limitation that the general users cannot easily use it due to the computational complexity and technical limitation.

DISCLOSURE

Technical Problem

It is, therefore, an object of the present invention to provide a method for acquiring a stable convergent type 3D multi-viewpoint image with little tremble by providing a user with a user interface for convergent type multi-viewpoint image acquisition, without using a special device or conducting a complex postprocessing.

Technical Solution

In accordance with the present invention, there is provided a method for acquiring a multi-viewpoint image in an image acquisition apparatus, the method including the steps of: (a) converting the image acquisition apparatus to a multi-viewpoint image photographing mode; (b) if converted to the multi-viewpoint image photographing mode in said step (a), providing a plurality of geometric shapes to set a position of an object to be photographed within a screen and selecting a desired shape of the geometric shapes in response to an inputted shape selection signal; (c) if said desired geometric shape is selected in said step (b), adjusting a position and a size of the selected geometric shape in response to a shape adjustment signal; and (d) photographing a whole image having the object that places within the adjusted geometric shape in said step (c).

The other objectives and advantages of the invention will be understood by the following description and will also be appreciated by the embodiments of the invention more clearly. Further, the objectives and advantages of the invention will readily be seen that they can be realized by the means and its combination specified in the claims.

Advantageous Effects

As mentioned above and below, the present invention is advantageous that it can save cost by acquiring a stable convergent type multi-viewpoint image without using a special device.

Furthermore, the present invention has an advantage in that the computational complexity can be reduced by acquiring a stable convergent type multi-viewpoint image without conducting a postprocessing.

DESCRIPTION OF DRAWINGS

The above and other objects and features of the present invention will become apparent from the following description of the preferred embodiments given in conjunction with the accompanying drawings, in which:

FIG. 2 is a view showing an example that photographs an object in a convergent type;

BEST MODE FOR THE INVENTION

The above-mentioned objectives, features, and advantages will be more apparent by the following detailed description in association with the accompanying drawings; and based on this, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
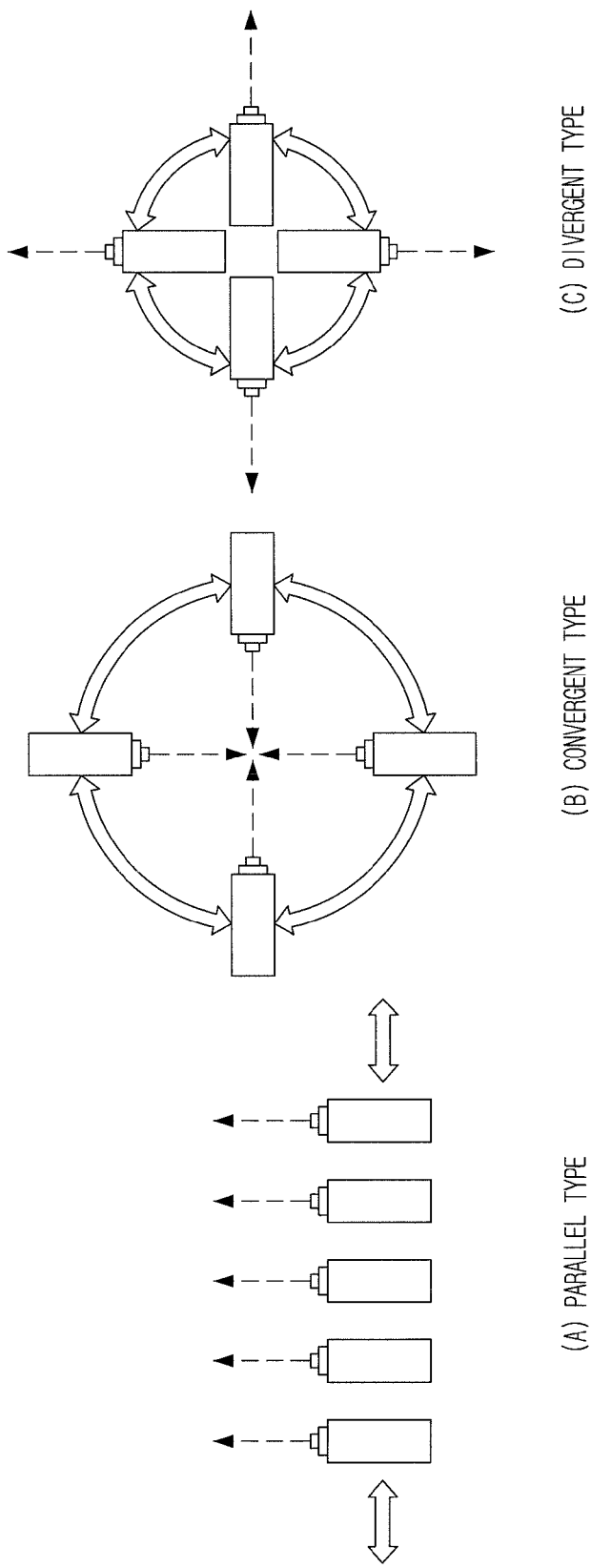
FIG. 1 is a view showing a conventional 3D image acquisition method.
Figure 3:
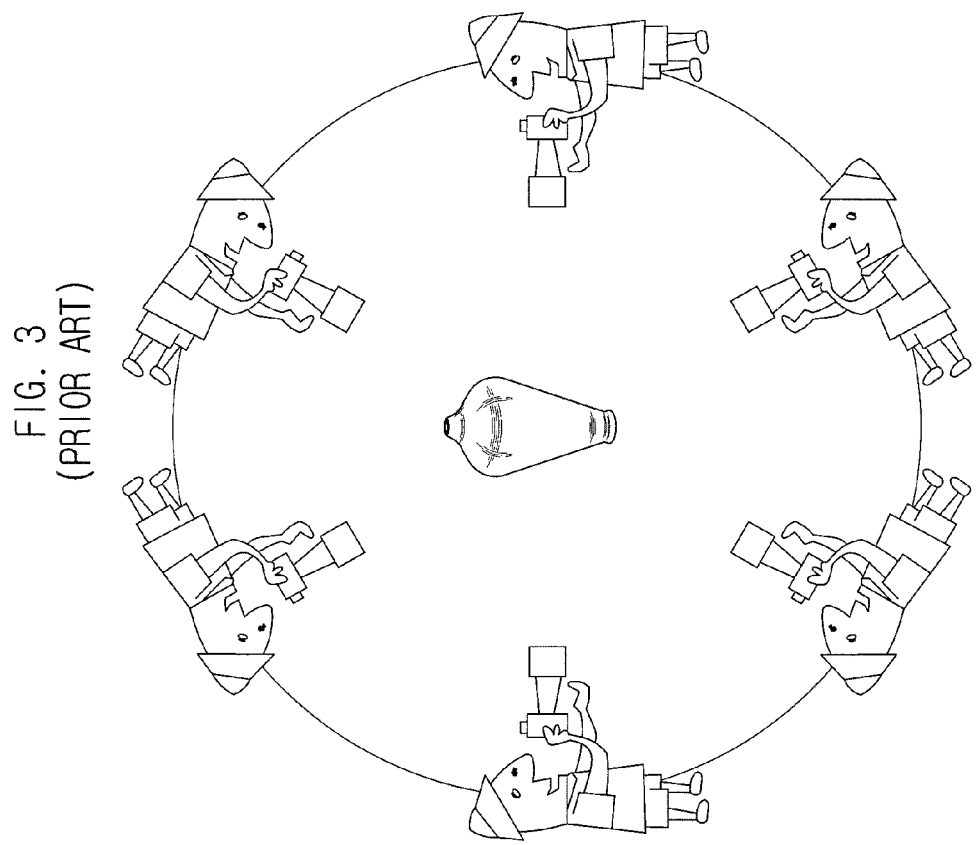
FIG. 3 is a view describing a conventional convergent type multi-viewpoint image photographing method.

FIG. 3 is a view describing a conventional convergent type multi-viewpoint image photographing method.

As shown in FIG. 3, it is illustrated that the user photographs at a plurality of viewpoints while moving circlewise in a center of an object to be photographed. The images photographed in this way offer image information of various viewpoints for the object.

In this case, the following conditions should be satisfied between images to acquire a stable convergent type multi-viewpoint image.

Firstly, a focus of image should be constant for each viewpoint; secondly, no zoom change should be made between images for each viewpoint; thirdly, a distance between an object and a camera should be maintained at a constant value in acquiring images for each viewpoint; and finally, the object should be photographed while moving at a same angle. When these conditions are satisfied on photographing, the user can stably view different viewpoints' images.

However, it is realistically impossible to meet all of the above conditions excepting using a special device; and therefore, one of realistic solutions is that the image acquisition device provides a photographer with appropriate information to photograph stable multi-viewpoint images so that the images are photographed with minimized tremble.

Figure 4:
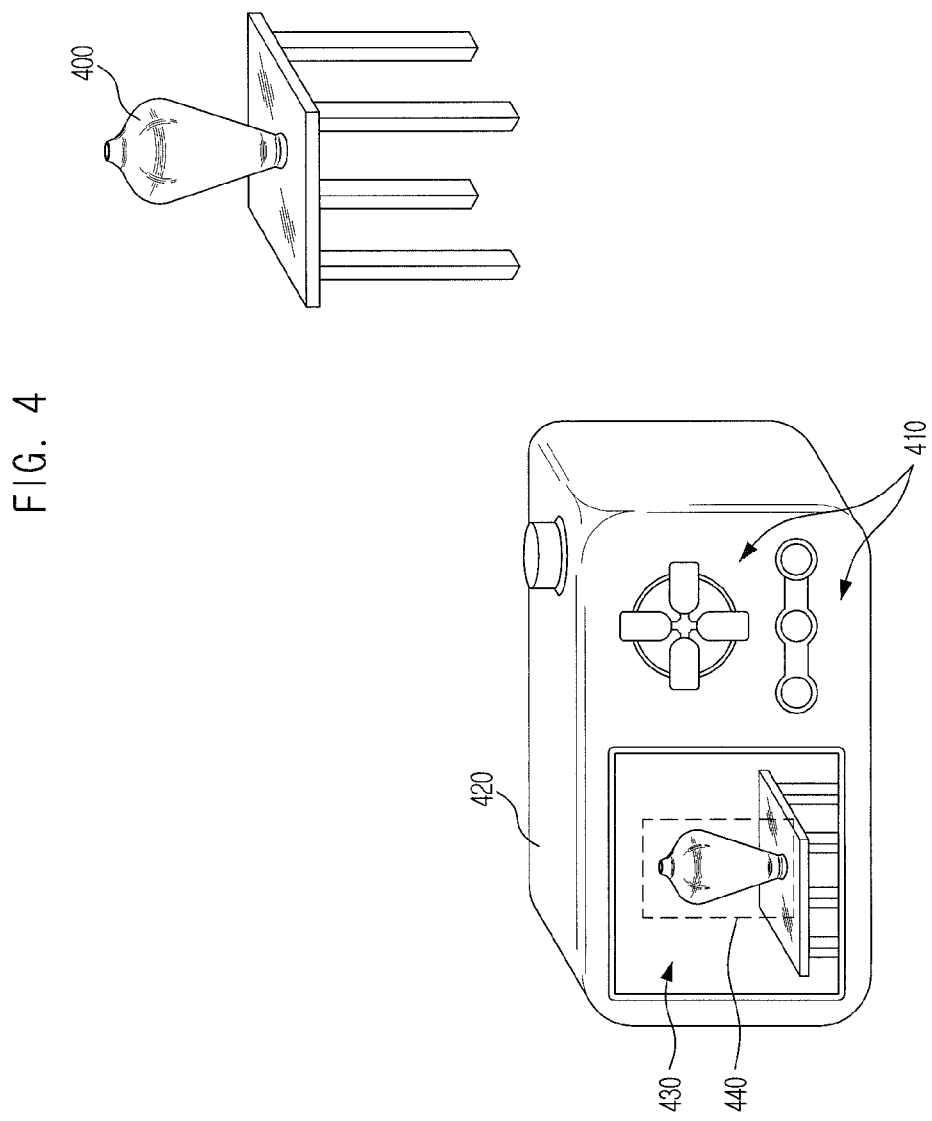
FIG. 4 is a view describing a process of acquiring convergent type multi-viewpoint image using an image acquisition apparatus in accordance with a preferred embodiment of the present invention.

FIG. 4 is a view describing a process of acquiring a convergent type multi-viewpoint image using an image acquisition apparatus in accordance with a preferred embodiment of the present invention.

To acquire the convergent type multi-viewpoint image in accordance with the present invention, the image acquisition apparatus 400 to which the invention is applied has features as follows.

Firstly, a function for convergent type image acquisition is included.

Secondly, a menu is provided for the user to select such function. That is, the image acquisition apparatus is provided with a menu operation and selection button 410, as shown in FIG. 4.

Thirdly, in case the user selects the convergent type multi-viewpoint image acquisition menu 410, he/she can acquire the convergent type multi-viewpoint image as shown in FIG. 3. Namely, the user can photograph an image for a fixed object 420 at a plurality of viewpoints while rotating it.

Fourthly, when the menu is selected, the image acquisition apparatus 400 provides the user with a signal for notifying that the convergent type multi-viewpoint image acquisition function is running.

Fifthly, various geometric shapes 440 are given to feature the shape of the object to be photographed at convergent type multi-viewpoints via an LCD window 430. These shapes may be circle, square, triangle, pentagon, etc., which may be moved horizontally, vertically, up and down by using the button 410 prepared in the image acquisition apparatus 400, and are also allowed to enlarge and reduce a size thereof. FIG. 4 provides the user with a rectangular shape 440 in acquiring convergent type multi-viewpoint image for a flower vase 420.

For instance, in case where the user photographs a certain object in the convergent type multi-viewpoint way, the image acquisition apparatus 400 to which the invention is applied offers a function capable of constantly fixing and arranging a position of the object to be photographed within the LCD window 430. Through this function, the user can minimize tremble of the object within the scene, which takes place due to a movement of photographing position.

Figure 5:
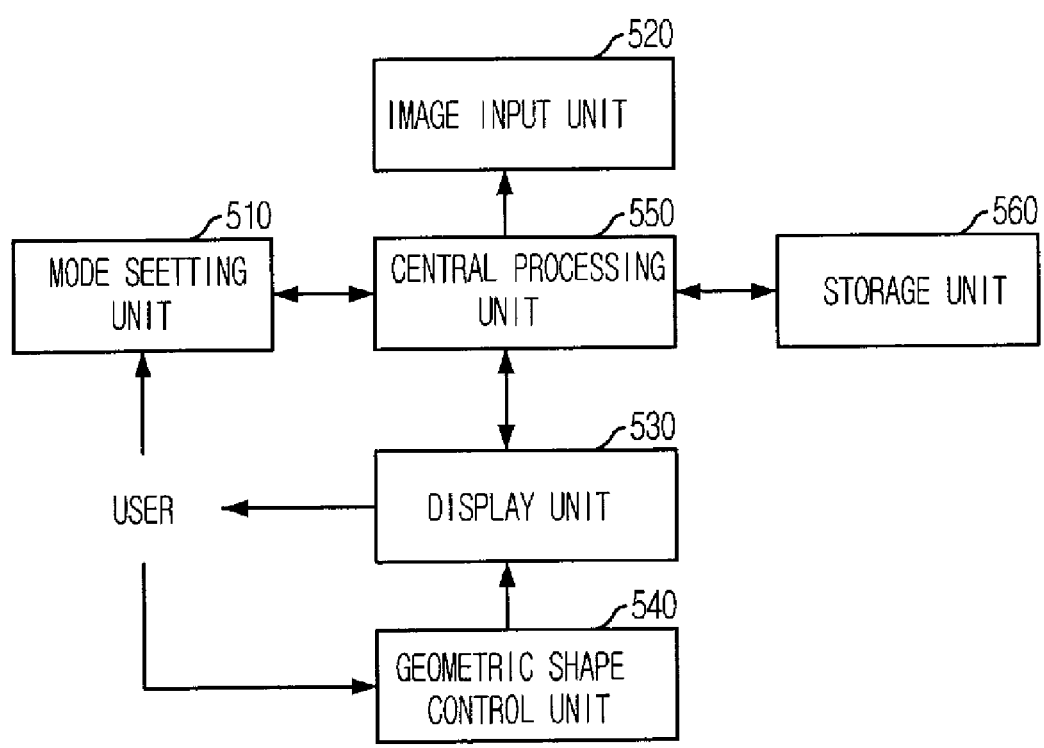
FIG. 5 is a block diagram of the image acquisition apparatus in accordance with the preferred embodiment of the invention.

FIG. 5 shows a block diagram of the image acquisition apparatus in accordance with a preferred embodiment of the invention.

As depicted in FIG. 5, the image acquisition apparatus 400 to which the invention is applied comprises a mode setting unit 510, an image input unit 520, a display unit 530, a geometric shape control unit 540, a central processing unit 550 and a storage unit 560.

The mode setting unit 510 converts the image acquisition apparatus 400 to a convergent type multi-viewpoint photographing mode in response to an instruction from the user; and the central processing unit 550 provides the user with an image inputted through the image input unit 520 via the display unit 530.

On the other hand, the geometric shape control unit 540 provides the user with the geometric shapes such as square, triangle, etc., which are selectable by the user, via the display unit 530. Then, it receives information associated with a geometric shape and its size change selected by the user and provides a corresponding geometric shape with proper shape and size via the display unit 530.

The storage unit 560 stores the convergent type multi-viewpoint images the user has photographed with respect to the specific object using the geometric shape.

Figure 6:
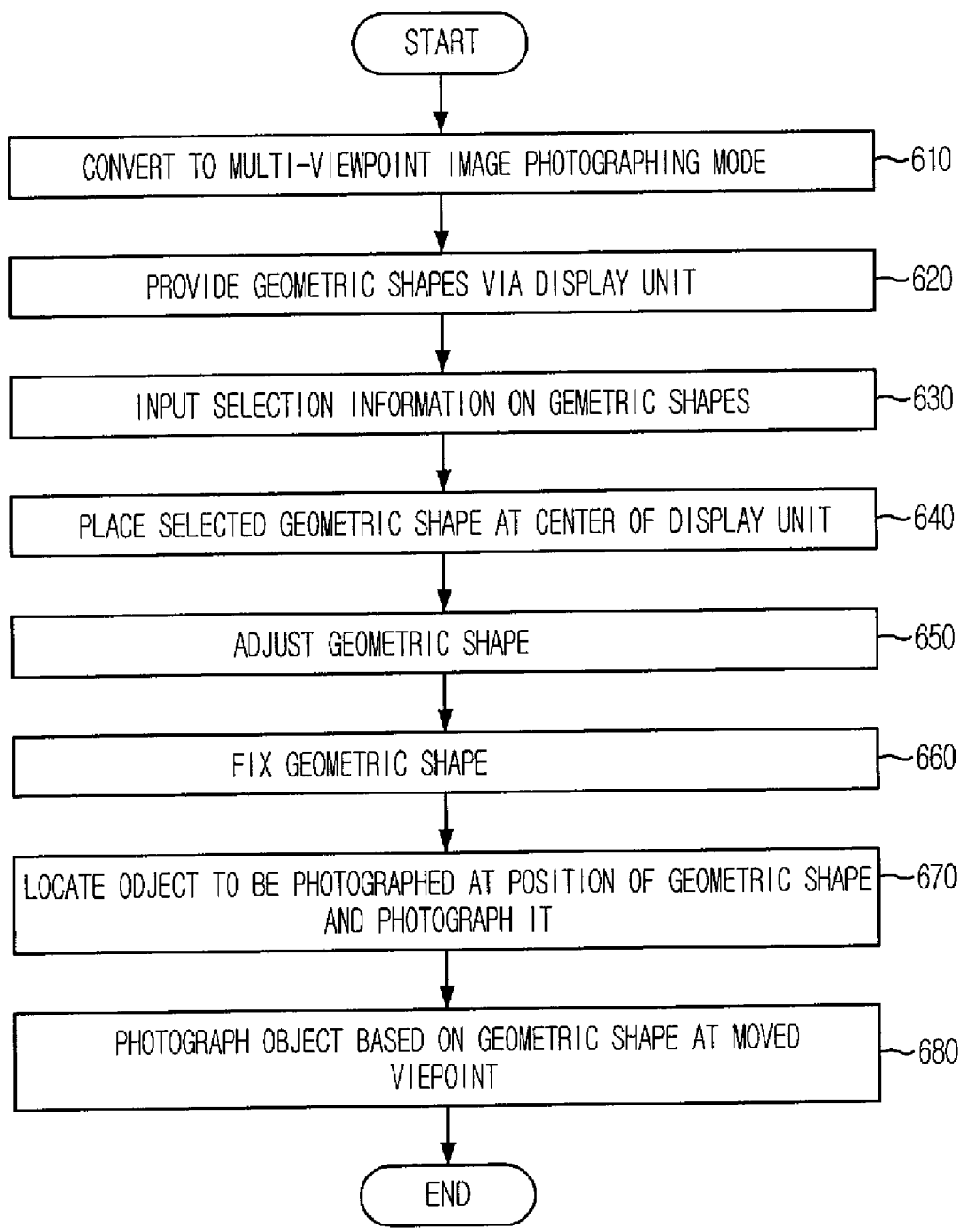
FIG. 6 is a flowchart for explaining a convergent type multi-viewpoint image acquisition method in accordance with the preferred embodiment of the invention.

FIG. 6 is a flowchart for describing a convergent type multi-viewpoint image acquisition method in accordance with the preferred embodiment of the invention.

First of all, at step S610, the image acquisition apparatus 400 is converted to multi-viewpoint image photographing mode in response to a request from the user via the mode setting unit 510. In other words, the user chooses an object to be photographed in the convergent type multi-viewpoint way and converts the image acquisition apparatus 400 to the convergent type multi-viewpoint image photographing mode using the mode setting unit 510.

Thereafter, the image acquisition apparatus 400 provides the user with geometric shapes to set a position of the object within the scene via the display unit 530 at step S620, and takes selection information on a desired shape of the geometric shapes from the user at step S630.

At a next step S640, the image acquisition apparatus 400 makes the geometric shape selected by the user to be placed at the center of the display unit 530. The geometric shape may be polygonal such as triangle, square, pentagon, hexagon, circle, or the like.

Meanwhile, the central processing unit 550 may adjust a focus for the object to be photographed, before or after performing said step S620.

Subsequently, the geometric shape control unit 540 adjusts, at step S650, the geometric shape in response to a position adjustment request for the geometric shape from the user, an enlargement/reduction request in horizontal/vertical direction, or an enlargement/reduction request while maintaining a preset proportion.

After adjusting the geometric shape, the apparatus 400 fixes the shape in response to a size fixation request thereof from the user at step S660. In addition, it may further carry out a process of fixing a focus for the object arranged on the scene where necessary.

After the geometric shape has been fixed, the apparatus 400 places the object to be photographed at the position of the fixed geometric shape and then photographs the same at step S670.

And then, at a moved viewpoint, the apparatus 400 places the object to be photographed within the fixed geometric shape at the same position as said step S670 and then photographs it at step S680. At this time, when the size of the object within the geometric shape is larger or smaller than that in said step S670 with respect to the geometric shape, the user may make the same size by moving it or using zoom function.

In the meantime, in case where the user wants to photograph different viewpoints' images continuously, said step S680 is repeatedly carried out.

The convergent type multi-viewpoint images for the specific object photographed in this manner may be provided on the internet via Java program, etc.; and may also be used on PC by means of a special program.

The method of the present invention as mentioned above may be implemented by a software program and stored in a computer-readable storage medium such as CD-ROM, RAM, ROM, floppy disk, hard disk, optical magnetic disk, or the like. This process may be readily carried out by those skilled in the art; and therefore, details of thereof are omitted here.

The present application contains subject matter related to Korean patent application No. 2004-0091935, filed in the Korean Intellectual Property Office on Nov. 11, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for acquiring a multi-viewpoint image in an image acquisition apparatus, the method comprising the steps of:
   (a) converting the image acquisition apparatus to a multi-viewpoint image photographing mode;
   (b) providing a plurality of geometric shapes to set a position of an object to be photographed within a screen and selecting a desired shape of the geometric shapes in response to an inputted shape selection signal, and wherein the desired shape of the geometric shapes is selected prior to the object being photographed;
   (c) adjusting a position and a size of the selected geometric shape in response to a shape adjustment signal; and
   (d) photographing a plurality of different images of the object, and wherein each of the plurality of different images of the object is photographed while having each of the respective images within the adjusted geometric shape in said step (c).

2. The method as recited in claim 1, wherein said step (b) includes the steps of:
   (b1) setting a focus for an object to be photographed;
   (b2) providing a plurality of geometric shapes to set a position of the object to be photographed;
   (b3) receiving selection information on a desired shape of the geometric shapes; and
   (b4) arranging the geometric shape selected in said step (b3) to be placed at a center of the screen at an initial time.

3. The method as recited in claim 1, wherein said step (c) includes the steps of:
   (c1) moving the selected geometric shape up, down, left and right in response to an up, down, left, and right movement signal;
   (c2) adjusting a size of the selected geometric shape in response to a size adjustment signal; and
   (c3) fixing the geometric shape whose position and size have been moved and adjusted in said steps (c1) and (c2).

4. The method as recited in claim 3, wherein the geometric shape is polygonal.

5. A method for acquiring a multi-viewpoint image in an image acquisition apparatus, the method comprising the steps of:
   (a) converting the image acquisition apparatus to a multi-viewpoint image photographing mode;
   (b) providing a plurality of geometric shapes to set a position of an object to be photographed within a screen and selecting a desired shape of the geometric shapes in response to an inputted shape selection signal, wherein the desired shape of the geometric shapes is selected prior to the object being photographed, and wherein the object is photographed while the object is within the geometric shape;
   (c) adjusting a position and a size of the selected geometric shape in response to a shape adjustment signal; and
   (d) photographing a plurality of different images of the object, and wherein each of the plurality of different images of the object is photographed while having each of the respective images within the adjusted geometric shape in said step (c).

* * * * *